United States Patent [19]
Yamashita

[11] Patent Number: 5,809,432
[45] Date of Patent: Sep. 15, 1998

[54] PORTABLE RADIO TERMINAL HAVING A REMOVABLE RADIO SYSTEM UNIT

[75] Inventor: Osamu Yamashita, Tokyo, Japan

[73] Assignee: NEC Corporation, Tokyo, Japan

[21] Appl. No.: 578,936

[22] Filed: Dec. 27, 1995

[30] Foreign Application Priority Data

Dec. 30, 1994 [JP] Japan ..................................... 6-340429

[51] Int. Cl.$^6$ ............................... H04B 1/38; H04M 1/00
[52] U.S. Cl. ........................................... 455/575; 455/557
[58] Field of Search .................................. 455/74, 76, 77, 455/89, 90, 575, 550, 557; 379/58, 357

[56] References Cited

U.S. PATENT DOCUMENTS

| | | | |
|---|---|---|---|
| 5,109,540 | 4/1992 | Dzung et al. .............................. | 455/89 |
| 5,115,182 | 5/1992 | Ehmke et al. ............................. | 455/89 |
| 5,134,717 | 7/1992 | Rasmussen ................................ | 455/89 |
| 5,335,276 | 8/1994 | Thompson et al. ........................ | 455/89 |
| 5,353,328 | 10/1994 | Jokimies .................................... | 455/89 |
| 5,448,765 | 9/1995 | Kovanen et al. .......................... | 455/90 |
| 5,524,134 | 6/1996 | Gustafson et al. ....................... | 455/410 |

FOREIGN PATENT DOCUMENTS

| | | |
|---|---|---|
| 443724 | 2/1992 | Japan . |
| 4330833 | 11/1992 | Japan . |
| 94/21058 | 9/1994 | WIPO ..................................... 455/90 |

*Primary Examiner*—Edward F. Urban
*Assistant Examiner*—Sam Bhattacharya
*Attorney, Agent, or Firm*—Whitham, Curtis & Whitham

[57] ABSTRACT

A portable radio apparatus comprises an apparatus body and a removable radio system unit which is detachably connected to the apparatus body. The removable radio system unit stores protocol specifying information which is transferred to the apparatus body when connected. A processor of the apparatus body controls the whole operation of the radio apparatus based on a protocol data set specified by the protocol specifying information received from the radio system unit. The protocol data set may be stored in the removable radio system unit. Alternatively, the apparatus body stores a plurality of protocol data sets and selects one of the protocol data sets according to the protocol specifying information.

20 Claims, 7 Drawing Sheets

PORTABLE RADIO TERMINAL HAVING A REMOVABLE RADIO SYSTEM UNIT

BACKGROUND OF THE INVENTION

1. Field of the Invention

The present invention generally relates to a radio communication terminal, and in particular to the circuit arrangement of a portable radio apparatus which is used in a plurality of radio communication systems having different requirements of protocols.

2. Description of the Related Art

With the wide use of mobile radio telephones, several mobile terminals have been proposed which are designed to provide the versatility to accommodate changes in requirements such as communication protocol changes.

As an example, a multi-band radio communication terminal is disclosed in Japanese Patent unexamined Publication No. 4-43724. This radioterminal is designed to accommodate a plurality of frequency bands, which is comprised of a common unit incorporating a controller and a plurality of band units corresponding to respective frequency bands. The band units are connected to the common unit through multi-pin connectors, which are further mechanically connected to each other to form an integral-type radio apparatus. Since each band unit can be removed, a desired frequency band communication can be made with the change of a band unit.

However, the multi-band terminal has a plurality of band units combined into one apparatus, causing the whole apparatus to inevitably increase in size and weight. Therefore, such an arrangement is not suitable for a portable terminal.

As another example, an architecture for a cellular telephone system is disclosed in Japanese Patent Unexamined Publication No. 4-330833. This architecture is comprised of various channel units RCU each having all of the cellular functions incorporated within a single circuit package, resulting in the enhanced versatility to accommodate changes in requirements by replacing just the particular module itself.

However, the architecture employs a signal processing module and a radio transceiver module which are combined mechanically and electrically into a single package. Therefore, the enhanced versatility to accommodate changes in requirements is obtained only in manufacturing. After the single package is manufactured, it is very difficult to change its specification so as to meet changed requirements. Further, since the architecture has a plurality of channel units each corresponding to one channel, the whole terminal of such an architecture is caused to increase in size and weight. Therefore, also this architecture is not suitable for a portable mobile terminal. In addition, the architecture is not applied to a mobile telephone handset but a base station of the cellular mobile telephone system.

SUMMARY OF THE INVENTION

An object of the present invention is to provide an arrangement for use in a portable radio apparatus which has the versatility to accommodate changes in communication requirements and achieves size and weight reduction.

Another object of the present invention is to provide a portable radio terminal which is usable in different communication protocols without the need of changing its main body.

A portable radio apparatus according to the present invention is comprised of an apparatus body and a removable radio system unit which is detachably connected to the apparatus body with a radio system circuit electrically connected to a circuit package of the apparatus body through connectors. The radio system unit provides protocol specifying information to a processor of the circuit package when connected to the apparatus body. The processor controls the whole operation of the radio apparatus based on the protocol specifying information received from the radio system unit.

According to an aspect of the present invention, the radio system unit holds system selection information indicating a single communication protocol. On the other hand, the apparatus body holds a plurality of system data sets each corresponding a different communication protocol. When the radio system unit is connected to the apparatus body, the processor reads the system selection information from the radio system unit and identifies the corresponding system data set which is used to control the whole operation of the radio apparatus.

According to another aspect of the present invention, the radio system unit holds a single system data set corresponding to a single communication protocol. On the other hand, the apparatus body is provided with a memory for storing the system data set. When the radio system unit is connected to the apparatus body, the processor reads the system data set from the radio system unit, which is used to control the whole operation of the radio apparatus.

According to the present invention, by selecting one of a plurality of radio system units each corresponding to a different communication protocol and connecting it to the apparatus body, a radio apparatus meeting the requirements of a desired communication protocol is easily obtained. More specifically, by replacing a radio system unit to another one, a user can easily obtain the radio apparatus which is usable in a plurality of radio communication systems, resulting in improved use efficiency of the radio apparatus without reducing in portability. Since the apparatus body is in common use in different communication protocols, the number of manufacturing steps are reduced, and a low-cost radio apparatus is achieved.

DETAILED DESCRIPTION OF THE PREFERRED EMBODIMENTS

Figure 1:
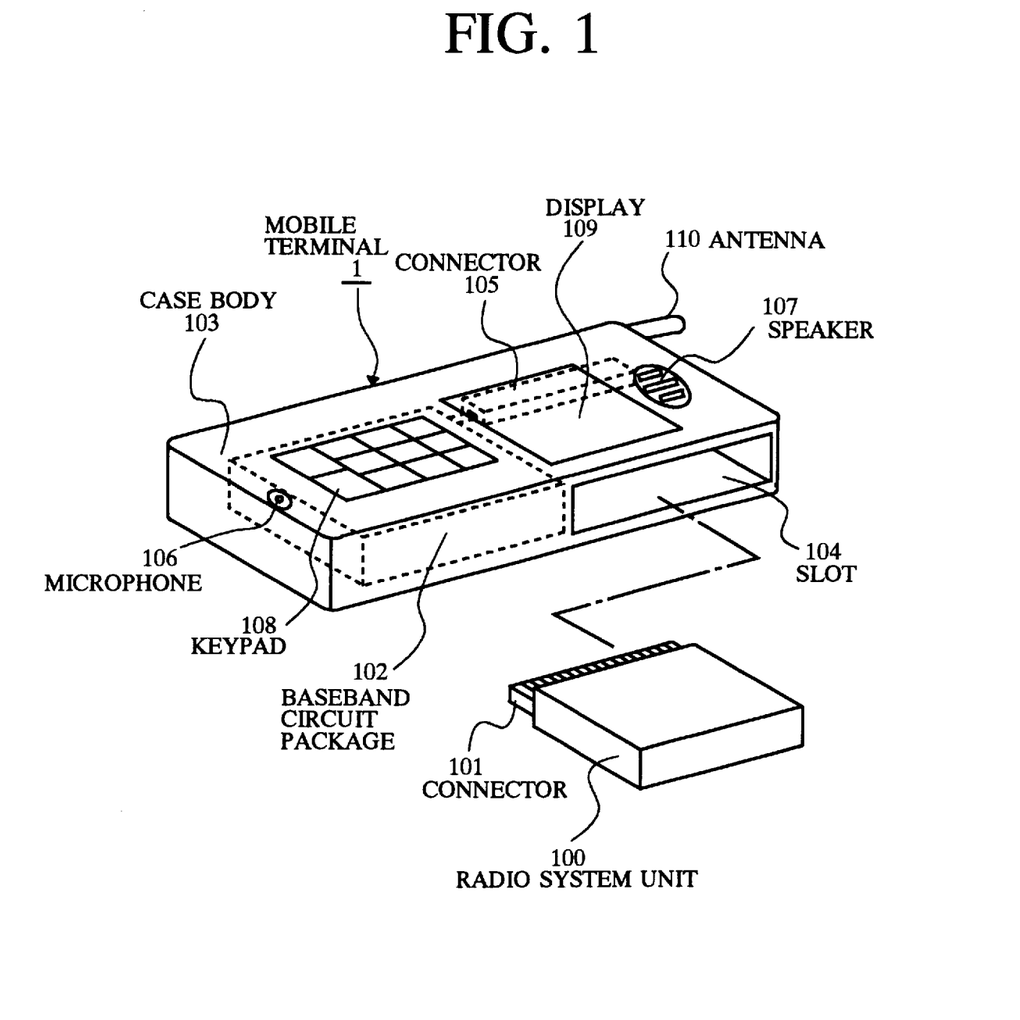
FIG. 1 is a perspective view of a mobile terminal handset according to the present invention.

Referring to FIG. 1, a mobile terminal 1 such as a mobile telephone handset is provided with a removable radio system unit 100 which is formed as a small card having a connector 101 at the end thereof. The mobile terminal 1 is further provided with a baseband circuit package 102 permanently incorporated within a case body 103 thereof. The case body 103 of the mobile terminal 1 has a slot 104 on the side wall thereof, into which the radio system unit 100 is inserted so as to be detachably connected to the mobile terminal 1. The slot 104 is provided with a connector 105 in the innermost part thereof. The radio system unit 100 is electrically connected to the baseband circuit package 102 through the connectors 101 and 105. A detachable connection mechanism between the radio system unit 100 and the case body 103 is known well in the field of portable computers. Since the terminal 1 employs a detachable/attachable separation structure between the radio system unit 100 and the case body 103 incorporating the baseband circuit package 102, when preparing a plurality of radio system units corresponding to different communication protocols, respectively, a user selects a desired one from the radio system units and inserts it to the slot 104 of the mobile terminal 1, enabling radio communications in the desired mobile communication system.

The main surface of the case body 103 is provided with a microphone 106, a speaker 107, a keypad 108 and an LCD (liquid crystal display) 109. An antenna 110 is placed on the top wall of the case body 103 and is electrically connected to the radio system unit 100 through the connectors 101 and 105.

Figure 2:
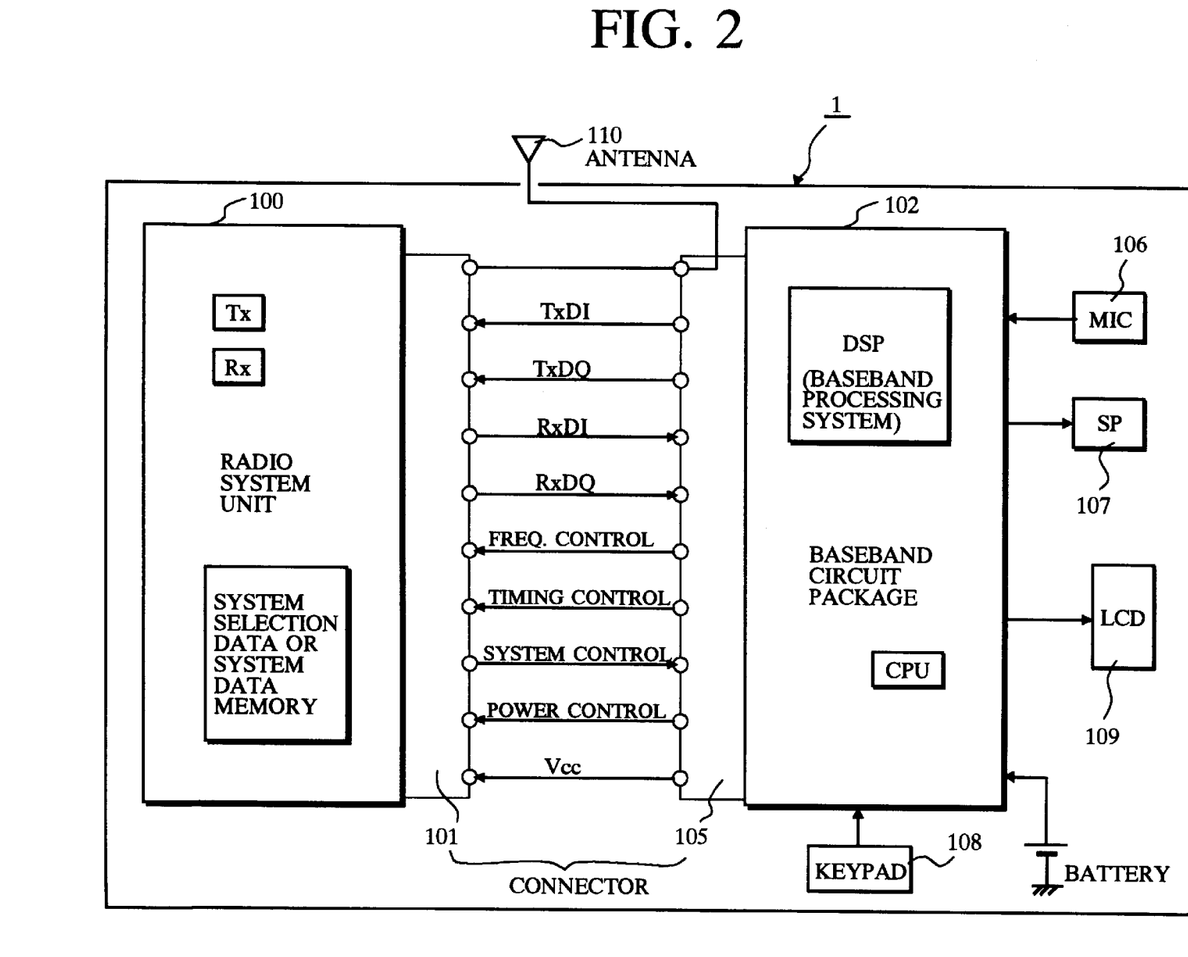
FIG. 2 is a block diagram showing a schematic circuit configuration of a mobile terminal according to a first embodiment of the present invention.

Referring to FIG. 2, the radio system unit 100 and the baseband circuit package 102 are electrically connected to each other through the connectors 101 and 105. Transmission signals TxDI and TxDQ are transferred from the baseband circuit package 102 to the radio system unit 100 and reception signals RxDI and RxDI are from the radio system unit 100 to the baseband circuit package 102. Further, a frequency control signal and a timing control signal are transferred from the baseband circuit package 102 to the radio system unit 100.

A system selection signal or a selected system data signal is transferred from the radio system unit 100 to the baseband circuit package 102 in order to cause the operations of this mobile terminal to meet a desired communication protocol as described in detail later. Therefore, by replacing a radio system unit 100 with another radio system unit 100 corresponding to a different communication protocol, the mobile terminal 1 can accommodate various mobile communication systems.

A battery supplies power to the baseband circuit package 102 which in turn supplies a power supply voltage Vcc to the radio system unit 100 together with a power control signal. It should be noted that other necessary control signals are not shown in this figure as well as the following figures for simplicity.

FIRST EMBODIMENT

According to a first embodiment of the present invention, a radio system unit 100 previously stores system selection data indicative of the communication protocol required for a desired communication system. The baseband circuit package 102 previously stores the system data sets of a predetermined number of communication Systems each employing a different communication protocol. Receiving the system selection data from the radio system unit 100, the baseband circuit package 102 selects one of the system data sets before forming a baseband processing system which enables the transmission and reception of baseband signals and which controls the radio system unit 100 in accordance with the selected communication protocol.

Figure 3:
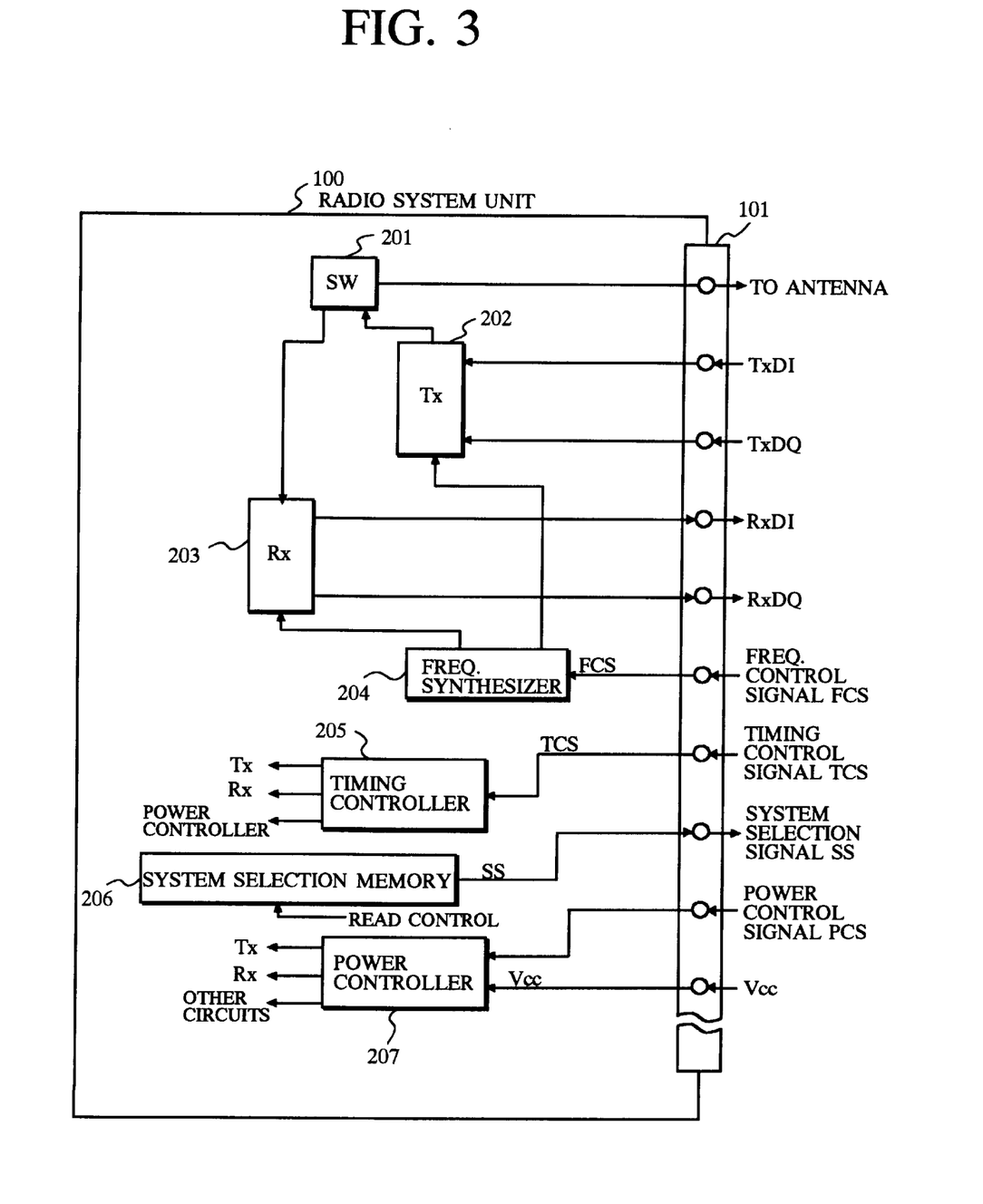
FIG. 3 is a detailed block diagram showing the circuit configuration of a removable radio system unit of the mobile terminal according to the first embodiment.

As illustrated in FIG. 3, the radio system unit 100 incorporates an antenna switch (or a duplexer) 201, a radio transceiver comprising an RF transmitter 202 and an RF receiver 203, a frequency synthesizer 204, a timing controller 205, a system selection memory 206, and a power controller 207. The antenna switch 201 connects the RF transmitter 202 and the RF receiver 203 to the antenna 110 through the connectors 101 and 105. The RF transmitter 202 receives transmitting signals TxDI and TxDQ from the baseband circuit package 102 through the connectors 101 and 105 and performs quadrature-modulation of the transmission signals TxDI and TxDQ to produce a transmitting RF signal. The RF receiver 203 performs quadrature-demodulation of a received RF signal to produce the reception signals RxDI and RxDQ which are transferred to the baseband circuit package 102 through the connectors 101 and 105. The frequency synthesizer 204 causes the RF transmitter 202 and the RF receiver 203 to generate the transmitting and receiving radio frequencies, or channels, which are changed according to the frequency control signal FCS received from the baseband circuit package 102. The timing controller 205 controls the operation timing of the RF transmitter 202, the RF receiver 203, the power controller 207, and other circuits in accordance with the timing control signal TCS received from the baseband circuit package 102.

The system selection memory 206 is formed with a read-only memory or a non-volatile memory storing the system selection data indicative of a single communication protocol. The system selection signal SS is read out from the system selection memory 206 under the read control of the baseband circuit package 102. The power controller 207 supplies power to the RF transmitter 202, the RF receiver 203, and other circuits according to the power control signal PCS received from the baseband circuit package 102. For example, the power saving is performed in intermittent receiving mode by the power controller 207.

Figure 4:
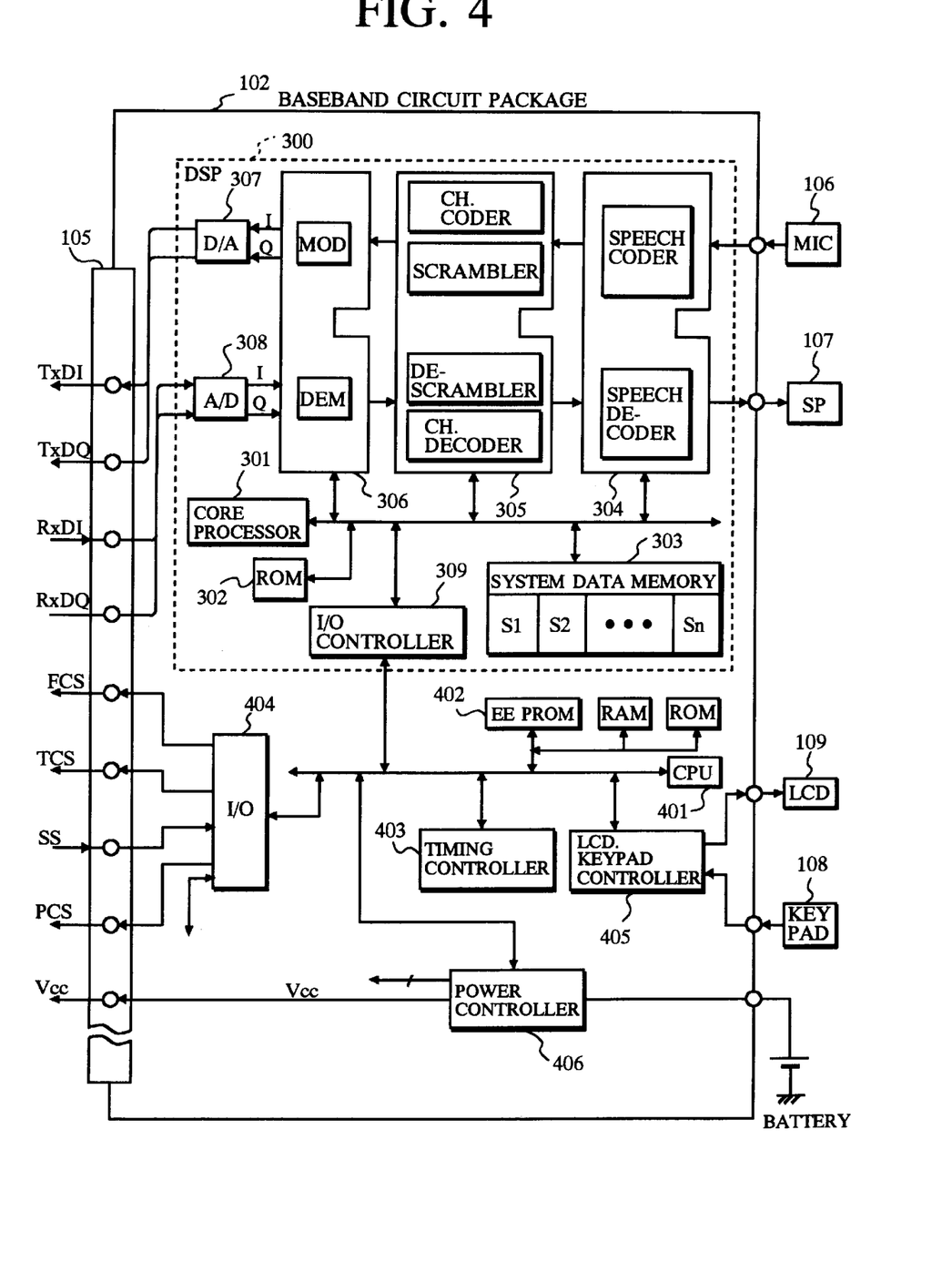
FIG. 4 is a detailed block diagram showing the circuit configuration of a baseband circuit package of the mobile terminal according to the first embodiment.

As illustrated in FIG. 4, the baseband circuit package 102 is comprised of a digital signal processor (DSP) 300 which implements a modulator-demodulator (MODEM), a channel coder, decoder (CODEC), a speech CODEC, and other necessary functions. As known well in DSP, the digital processing functions like these are implemented by program control. The detailed arrangement and operations will be described later.

The baseband circuit package 102 is further comprised of a central processing unit (CPU) 401 which is connected to the DSP 300, a memory 402, a timing controller 403, an input/output (I/O) controller 404, a controller 405 for the LCD 109 and the keypad 108, and a power controller 406 through buses so as to control the operations of the mobile telephone terminal 1. The memory 402 is usually formed with an electrically erasable programmable read-only memory (EEPROM) for storing fixed data such as an identification number. The timing controller 403 controls the operation timing of the telephone terminal 1 under control of the CPU 401. The I/O controller 404 outputs the frequency control signal FCS to the frequency synthesizer 204, the timing control signal TCS to the timing controller 205, and the power control signal PCs to the power controller 207. Further, the I/O controller 404 inputs the system selection signal SS from the system selection memory 206. The power controller 406 incorporates a DC-DC converter which supplies power to the circuits of the baseband circuit package 102 and to the radio system unit 100 through the connectors 101 and 105.

BASEBAND SIGNAL PROCESSING

The DSP 300 is comprised of a core processor 301, a read-only memory 302, a system data memory 303, a digital-to-analog (D/A) converter 307, an analog-to-digital (A/D) converter 308, and an input/output (I/O) controller 309.

The core processor 301 implements the baseband processing system comprising a speech CODEC 304, a channel CODEC 305 and a MODEM 306 by using a system data get stored in the system data memory 303. The system data memory 303 previously stores a plurality of system data sets S1 to Sn each representing a different communication protocol. The core processor 301 selects one system data set from the previously stored system data sets S1 to Sn in accordance with the system selection data received from the system selection memory 206 of the radio system unit 100.

A system data set has the predetermined items necessary for implementing a certain communication protocol, including a radio access scheme, the number of channels per carrier, a carrier step, a channel bit rate, a modulation scheme, a scrambling scheme, and a speech coding scheme. Therefore, by receiving the system data set from the system data memory 303, the core processor 301 can form a baseband processing system operating in accordance with the desired communication protocol. For example, the speech CODEC 304 may be an ADPCN or RPE-LTP CODEC. The channel CODIC 305 may employ a radio access scheme of TDMA/TDD, TDIR/FDD, FDPA/TDD or TDMA/FDD, and predetermined scrambling/descrambling. The MODEM 306 may employ pi/4-shift QPSK, FSK or GMSK modulation scheme.

Setting the DSP 300 to the desired baseband processing system, speech signals received from the microphone 106 are coded by the speech CODSC 304 and the channel CODEC 305, and then modulated by the MODEM 306. The modulated in-phase (I) and quadrature-phase (Q) transmitting signals are converted into analog transmitting signals TxDI and TxDQ, respectively, and are transferred to the RF transmitter 202 of the radio system unit 100 through the connectors 105 and 101. On the other hand, the received signals RxDI and RxDQ from the RF receiver 203 of the a radio system unit 100 are converted to digital received signals, respectively, and then are demodulated by the MODEM 306. The demodulated signal is decoded by the channel CODEC 305 and the speech CODEC 304, and then sound waves are reproduced by the speaker 107.

It should be noted that the arrangement of the DSP 300 as shown in FIG. 4 is simplified and deformed. The input/output signals of the D/A and A/D converters 307 and 308 and the speech CODEC 304 are actually transferred through the I/O controller 309.

RADIO SYSTEM CONTROL

When selecting one system data set from the system data sets previously stored in the system data memory 303, the core processor 301 transfers the system data necessary for RF transmitting and RF receiving operations to the processor 401 through the I/O controller 309. The processor 401 produces the frequency control signal FCS, the timing control signal TCS, the power control signal PCS and other necessary control signals according to the selected system data set, that is, the desired communication protocol. These control signals are transferred to the radio system unit 100 through the I/O controller 404 and the connectors 105 and 101. The radio system control is performed according to these control signals as described before.

SYSTEM DATA SELECTION

In the first embodiment, the system selection data is stored in the system selection memory 206 of the radio system unit 100. Therefore, when the radio system unit 100 is inserted into the slot 104 and electrically connected to the baseband circuit package 102, the processor 401 reads the system selection signal SS from the system selection memory 206 through the I/O controller 404 and then outputs a system setting control signal to the core processor 301 of the DSP 300 through the I/O controller 309 so as to inform the core processor 301 of the communication protocol which is required for the radio system unit 100 connected to the baseband circuit package 102. On reception of the system setting control signal, the core processor 301 reads the system data set corresponding to the system setting control signal from the system data memory 303 to implement the baseband processing system on the DSP 300 as mentioned above. At the same time, the core processor 301 outputs the system data necessary for the RF system operations to the processor 401 through the I/O controller 309 and then the system data for the RF system operations are transferred to the radio system unit 100. In this manner, the radio telephone terminal 1 is changed to a system terminal which meets the requirements of the communication protocol designated by the radio system unit 100 inserted into the slot 104.

HOW TO USE

First, the user prepares a single portable radio telephone terminal 1 and a plurality of card-type radio system units each comprising the system selection memory 206 which stores system selection data designating a certain communication protocol. The user selects a single radio system unit 100 corresponding to a communication system to be used and inserts it into the slot 104 of the case body 103, which causes the radio system unit 100 to be connected to the baseband circuit package 102 and the antenna 110. When detecting the connection of the radio system unit 100, as described above, the processor 401 controls the DSP 300 and the radio system unit 100 so as to implement the baseband processing system and the RF system, respectively, according to the system selection signal SS. As a result, the user easily obtains the radio telephone terminal of a desired communication protocol. In other words, by replacing the card-type radio system unit 100 with another one, the user can easily obtain the radio telephone terminal which is usable in a desired radio mobile communication system, resulting in improved use efficiency of the radio telephone terminal without reducing in portability. Since the baseband circuit package 102 is in common use in different communication protocols, the number of manufacturing steps are reduced, and a low-cost radio telephone terminal is achieved.

SECOND EMBODIMENT

According to a second embodiment of the present invention, a single radio system unit 100 previously stores a system data set representing the communication protocol required for a desired communication system. Receiving the system data set from the radio system unit 100, the baseband circuit package 102 forms a baseband processing system which enables the transmission and reception of baseband signals and controls the radio system unit 100 in accordance with the communication protocol.

Figure 5:
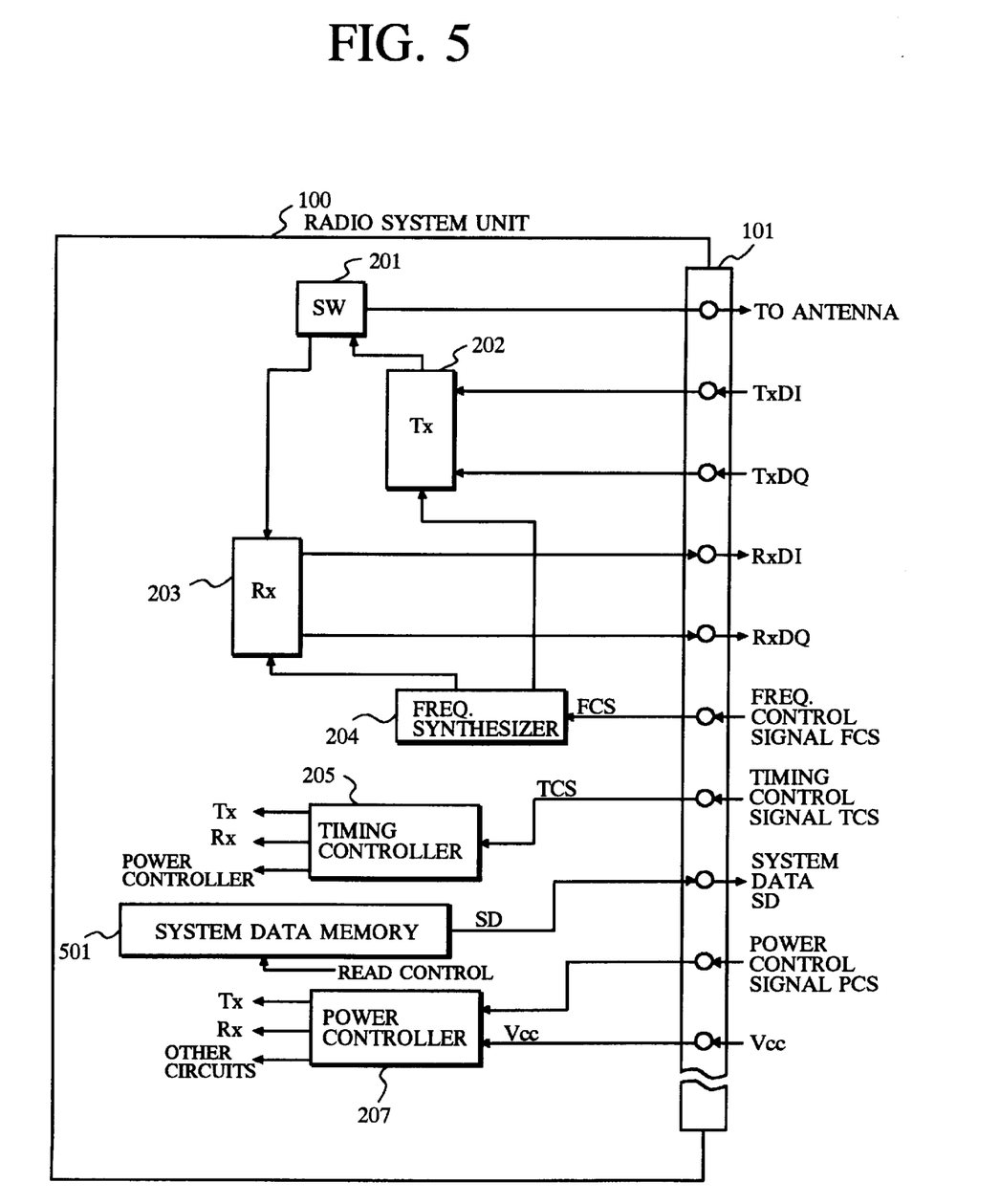
FIG. 5 is a detailed block diagram showing the circuit configuration of a removable radio system unit of a mobile terminal according to a second embodiment of the present invention.

As illustrated in FIG. 5, where circuit blocks similar to those previously described with reference to FIG. 3 are denoted by the same reference numbers and the detailed description is omitted, a system data memory 501 is provided in the radio system unit 100. The system data memory 501 is formed with a read-only memory or a non-volatile memory storing the system data set representing a single communication protocol.

Figure 6:
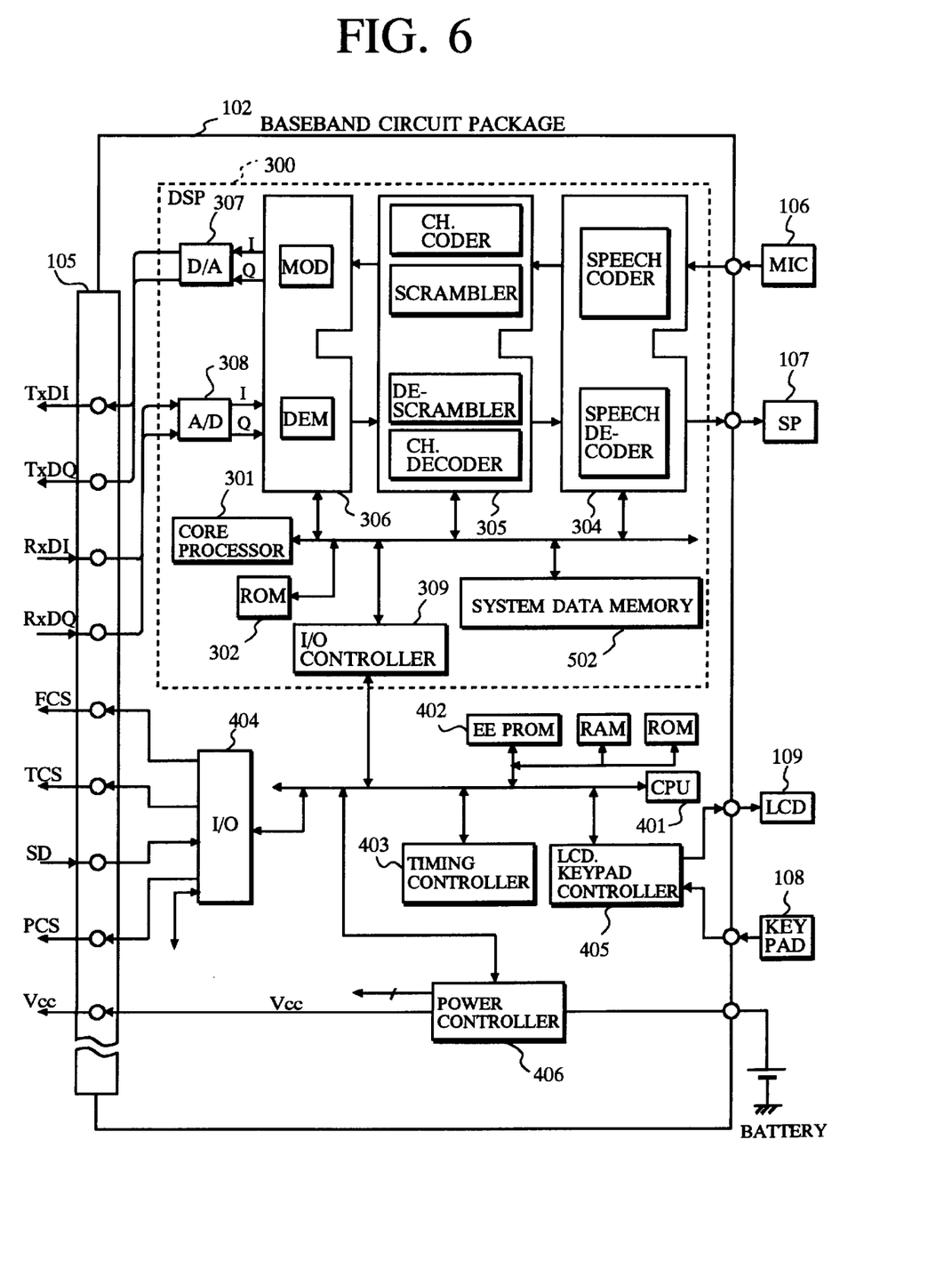
FIG. 6 is a detailed block diagram showing the circuit configuration of a baseband circuit package of the mobile terminal according to the second embodiment.

As illustrated in FIG. 6, where circuit blocks similar to those previously described with reference to FIG. 4 are denoted by the same reference numbers and the detailed description in omitted, the baseband circuit package 102 is comprised of the DSP 300 and the CPU 401 which is connected to the DSP 300, the memory 402, the timing controller 403, the I/O controller 404, the controller 405 for the LCD 109 and the keypad 108, and the power controller 406 through buses so as to control the operations of the mobile telephone terminal 1. The timing controller 403 controls the operation timing of the telephone terminal I under control of the CPU 401. The I/O controller 404 outputs the frequency control signal FCS to the frequency synthesizer 204, the timing control signal TCS to the timing controller 205, and the power control signal PCS to the power controller 207. Further, the I/O controller 404 inputs the system data set SD from the system data memory 501.

BASEBAND SIGNAL PROCESSING

The DSP 300 is comprised of a core processor 301, a read-only memory 302, a system data memory 502, a digital-to-analog (D/A) converter 307, an analog-to-digital (A/D) converter 308, and an input/output (I/O) controller 309.

The core processor 301 implements the baseband processing system comprising the speech CODIC 304, the channel CODEC 305 and the MODEM 306 by using the necessary system data stored in the system data memory 502. A system data set has the predetermined item necessary for implementing a certain communication protocol, including a radio access scheme, the number of channels per carrier, a carrier step, a channel bit rate, a modulation scheme, a scrambling scheme, and a speech coding scheme. Therefore, when receiving the system data set from the system data memory 501 of the radio system unit 100, the processor 401 selects the necessary system data for formation of the baseband processing system and outputs the necessary system data to the system data memory 502 of the DSP 300 through the I/O controller 309. Using the necessary system data stored in the system data memory 502, the core processor 301 implements the baseband processing system.

RADIO SYSTEM CONTROL

When receiving the system data set from the radio system unit 100, the processor 401 produces the frequency control signal FCS, the timing control signal TCS, the power control signal PCS and other necessary control signals according to the system data set, that is, the desired communication protocol. These control signals are transferred to the radio system unit 100 through the I/O controller 404 and the connectors 105 and 101. The radio system control is performed according to these control signals as described before.

SYSTEM DATA SELECTION

In the second embodiment, the system selection data is stored in the system data memory 501 of the radio system unit 100. Therefore, when the radio system unit 100 is inserted into the slot 104 and electrically connected to the baseband circuit package 102, the processor 401 reads the system data set SD from the system data memory 501 through the I/O controller 404 and then outputs the above-mentioned necessary system data to the core processor 301 of the DSP 300 through the I/O controller 309 so as to inform the core processor 301 of the communication protocol which is required for the radio system unit 100 connected to the baseband circuit package 102. On reception of the necessary system data, the core processor 301 stores the necessary system data into the system data memory 502 to implement the baseband processing system on the DSP 300 as mentioned above. In this manner, the radio telephone terminal 1 is changed to a system terminal which meets the requirements of the communication protocol designated by the radio system unit 100 inserted into the slot 104.

HOW TO USE

First, the user prepares a single portable radio telephone terminal 1 and a plurality of card-type radio system units each comprising the system selection memory 206 which stores a system data set representing a certain communication protocol. The user selects a single radio system unit 100 corresponding to the communication system to be used and inserts it into the slot 104 of the case body 103, which causes the radio system unit 100 to be connected to the baseband circuit package 102 and the antenna 110. When detecting the connection of the radio system unit 100, as described above, the processor 401 controls the DSP 300 and the radio system unit 100 so as to implement the baseband processing system and the RF system, respectively, according to the system data set SD. As a result, the user easily obtains the radio telephone terminal of a desired communication protocol. In other words, by replacing the card-type radio system unit 100 with another one, the user can easily obtain the radio telephone terminal which is usable in a desired radio mobile communication system, resulting in improved use efficiency of the radio telephone terminal without reducing in portability. Since the baseband circuit package 102 is in common use in different communication protocols, the number of manufacturing steps are reduced, and a low-cost radio telephone terminal is achieved.

Furthermore, the second embodiment has an added advantage. Since a plurality of system data sets do not have to be stored in the baseband circuit package 102 but only a single system data set is stored in the radio system unit 100, the amount of memory provided in the baseband circuit package 102 becomes smaller than that of the first embodiment.

THIRD EMBODIMENT

A third embodiment of the present invention employs the same radio system unit 100 as that as shown in FIG. 3.

Figure 7:
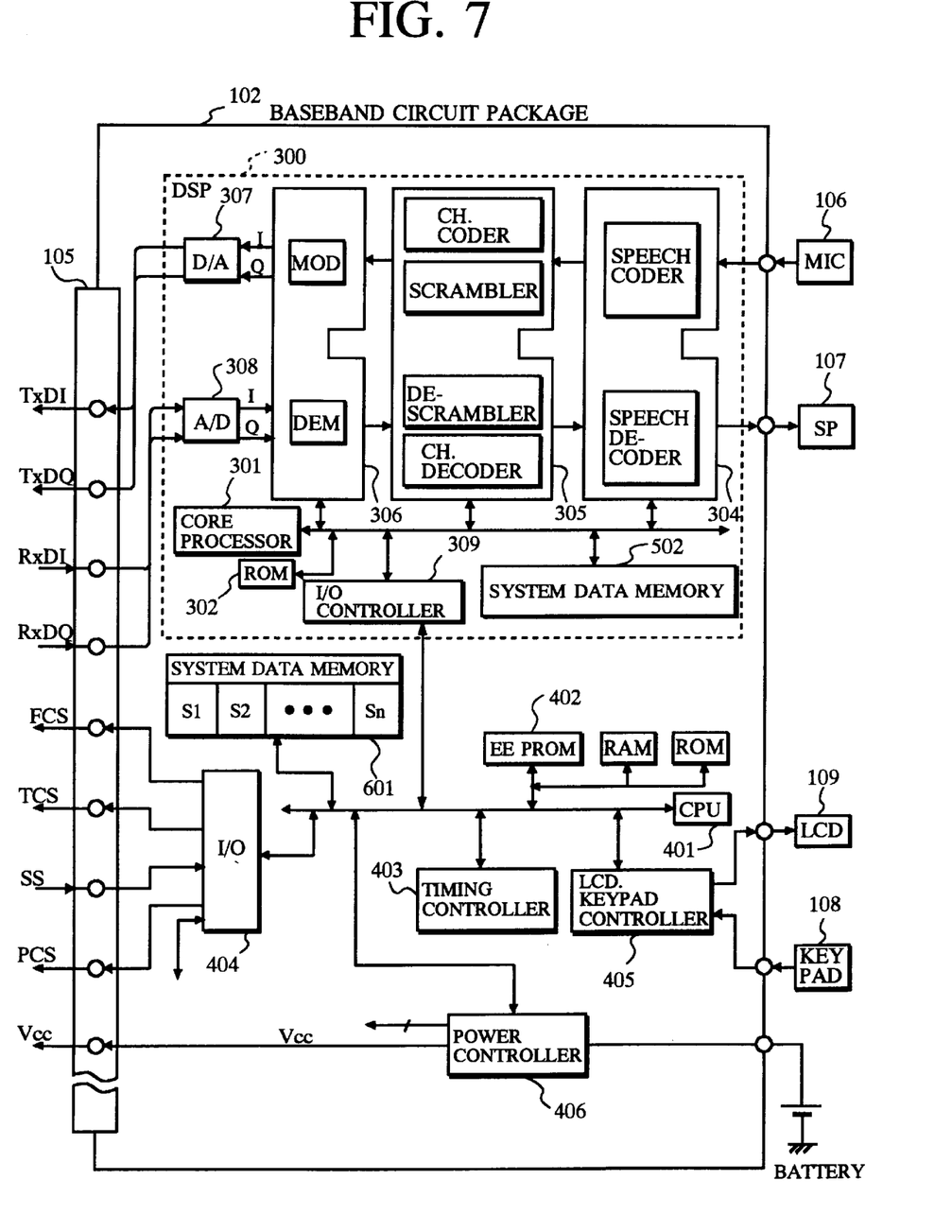
FIG. 7 is a detailed block diagram showing the circuit configuration of a baseband circuit package of a mobile terminal according to a third embodiment of the present invention.

FIG. 7 shows a baseband circuit package 102 of the third embodiment, where circuit blocks similar to those previously described with reference to FIG. 6 are denoted by the same reference numbers and the detailed description is omitted. The baseband circuit package 102 is comprised of the DSP 300 and the CPU 401 which is connected to the DSP 300, the memory 402, the timing controller 403, the I/O controller 404, the controller 405 for the LCD 109 and the keypad 108, the power controller 406, and a system data memory 601 through buses so as to control the operations of the mobile telephone terminal 1. The timing controller 403 controls the operation timing of the telephone terminal 1 under control of the CPU 401. The I/O controller 404 outputs the frequency control signal FCS to the frequency synthesizer 204, the timing control signal TCS to the timing controller 205, and the power control signal PCS to the power controller 207. Further, the I/O controller 404 inputs the system selection data SS from the system data memory 206.

The system data memory 601 previously stores a plurality of system data sets S1 to Sn each representing a different communication protocol. The processor 401 selects one system data set from the previously stored system data sets S1 to Sn in accordance with the system selection data received from the system selection memory 206 of the radio system unit 100.

After selecting the system data set from the system data memory 601, the processor 401 further selects the necessary system data for formation of the baseband processing system and outputs the necessary system data to the system data memory 502 of the DSP 300 through the I/O controller 309. Using the necessary system data stored in the system data memory 502, the core processor 301 implements the baseband processing system.

The processor 401 produces the frequency control signal FCS, the timing control signal TCS, the power control signal PCS and other necessary control signals according to the selected system data set. These control signals are transferred to the radio system unit 100 through the I/O controller 404 and the connectors 105 and 101. The radio system control is performed according to these control signals as described before.

In the third embodiment, the system selection data is stored in the system selection memory 206 of the radio system unit 100. Therefore, when the radio system unit 100 is inserted into the slot 104 and electrically connected to the baseband circuit package 102, the processor 401 reads the system selection signal SS from the system selection memory 206 through the I/O controller 404. According to the system selection data SS, the processor 401 selects the corresponding system data set from the system data memory 601, and outputs the control signals to the radio system unit 100 and the necessary system data to the DSP 300. On reception of the necessary system data, the core processor 301 stores the necessary system data into the system data memory 502 to implement the baseband processing system on the DSP 300 as mentioned above. In this manner, the radio telephone terminal 1 is changed to a system terminal which meets the requirements of the communication protocol designated by the radio system unit 100 inserted into the slot 104.

What is claimed is:

1. A portable radio apparatus comprising:
   a radio system unit;
   an apparatus body; and
   connecting means for detachably connecting said radio system unit with said apparatus body,
   said radio system unit including:
   a radio transceiver for transmitting and receiving radio signals; and
   a first memory for storing protocol information corresponding to a single communication protocol selected from a plurality of communication protocols, and
   said apparatus body including:
   a second memory for storing a protocol data set for implementing said single communication protocol based on said protocol information received from the first memory through said connecting means;
   first processing means for implementing a baseband processing function based on said protocol data set stored in said second memory; and
   second processing means for controlling said radio transceiver such that said radio signals change frequency, transmission timing and reception timing based on said protocol data set.

2. The portable radio apparatus according to claim 1, wherein:
   said first memory includes protocol selection information specifying said single communication protocol; and
   said second memory includes a plurality of protocol data sets including said protocol data set.

3. The portable radio apparatus according to claim 2, wherein said first processing means selects said protocol data set from said plurality of protocol data sets stored in said second memory according to said protocol selection information received from said first memory of said radio system unit for implementing said baseband processing function.

4. The portable radio apparatus according to claim 2, wherein:
   said second processing means selects said protocol data set from said protocol data sets stored in said second memory according to said protocol selection information received from said first memory of said radio system unit; and
   said first processing means implements said baseband processing function based on said protocol data set.

5. The portable radio apparatus according to claim 1, wherein said first processing means includes a digital signal processor (DSP) for providing said baseband processing function, said baseband processing function changing specifications according to said protocol data set.

6. The portable radio apparatus according to claim 1, wherein said first processing means provides said baseband processing function, said baseband processing function changing specifications according to said protocol data set, said specifications including a radio access scheme, a modulation and demodulation scheme, and a speech coding and decoding scheme.

7. The portable radio apparatus according to claim 1, wherein:
   said first memory includes said protocol data set corresponding to said single communication protocol; and
   said second memory receives said protocol data set from said first memory of said radio system unit.

8. The portable radio apparatus according to claim 7, wherein;
   said second processing means transfers said protocol data set from said first memory of said radio system unit to said second memory of said apparatus body; and
   said first processing means implements said baseband processing function based on said protocol data set.

9. The portable radio apparatus according to claim 7, wherein said first processing means includes a digital signal processor (DSP) for providing said baseband processing function, said baseband processing function changing specifications according to said protocol data set.

10. The portable radio apparatus according to claim 7, wherein said first processing means provides said baseband processing function, said baseband processing function changing specifications according to said protocol data set, said specifications including a radio access scheme, a modulation and demodulation scheme, and a speech coding and decoding scheme.

11. The portable radio apparatus according to claim 1, wherein said radio transceiver includes a frequency generator for generating reference signals for changing said frequency of said radio signals according to said second processing means.

12. The portable radio apparatus according to claim 1, wherein said connecting means comprises a bay for detachably accommodating said radio system unit and for electrically connecting to said radio system unit.

13. A mobile communication terminal comprising:

a radio module pack having a card shape, comprising a first connector at a first end of said radio module pack; and a terminal body comprising a bay for detachably accommodating said radio module pack, said bay having a second connector for electrically connecting to said first connector when said radio module pack is accommodated by said bay, said radio module pack including:

a radio transceiver for transmitting and receiving radio signals; and a first memory for storing protocol information corresponding to a single communication protocol selected from a plurality of communication protocols, and said terminal body including:

a second memory for storing a protocol data set for implementing said single communication protocol based on said protocol information received from the first memory through said connecting means;

a first processor for implementing a baseband processing function based on said protocol data set stored in said second memory; and a second processor for controlling said radio module pack and said baseband processing function, such that said radio signals change frequency, transmission timing and reception timing based on said protocol data set and said baseband processing function operates based on said protocol data set.

14. The mobile communication terminal according to claim 13, wherein:

said first memory includes protocol selection information specifying said single communication protocol; and said second memory includes a plurality of protocol data sets including said protocol data set.

15. The mobile communication terminal according to claim 14, wherein said first processor selects said protocol data set from said protocol data sets in said second memory according to said protocol selection information received from said first memory of said radio module pack for implementing said baseband processing function.

16. The mobile communication terminal according to claim 15, wherein said first processor provides said baseband processing, said baseband processing function changing specifications according to said protocol data set, said specifications including a radio access scheme, a modulation and demodulation scheme, and a speech coding and decoding scheme.

17. The mobile communication terminal according to claim 13, wherein:

said first memory includes said protocol data set corresponding to said single communication protocol; and said second memory receives said protocol data set from said first memory of said radio module pack.

18. The mobile communication terminal according to claim 13, wherein said radio transceiver includes a frequency generator for generating reference signals for changing said frequency of said radio signals according to said second processor.

19. A method for setting a portable radio apparatus to a desired communication protocol, said portable radio apparatus comprising a radio system unit and an apparatus body detachably connected to said radio system unit, said radio system unit further including a radio transceiver, said method comprising the steps of:

preparing a plurality of radio system units, each of said radio system units including system selection data corresponding to different communication protocols;

storing a plurality of protocol data sets in said apparatus body, each of said protocol data sets being for implementing a different communication protocol in said apparatus body;

mechanically and electrical connecting a first radio system unit of said radio system units to said apparatus body;

transferring said system selection data from said first radio system unit to said apparatus body;

selecting a first protocol data set of said protocol data sets according to said system selection data received from said first radio system unit;

implementing, by a first processor in said apparatus body, a baseband processing function based on said first protocol data set; and controlling, by a second processor in said apparatus body, said radio transceiver such that a frequency of a radio signal associated with said transceiver, a transmission timing of said radio signal and a reception timing of said radio signal are changed based on said first protocol data set.

20. A method for setting a portable radio apparatus to a desired communication protocol, said portable radio apparatus comprising a radio system unit and an apparatus body detachably connected to said radio system unit, said radio system unit body further including a radio transceiver, said method comprising the steps of:

preparing a plurality of radio system units, each of said radio system units including a different protocol data set for implementing a different communication protocol;

electrically and mechanically connecting a first radio system unit of said radio system units to said apparatus body;

transferring a first protocol data set of said protocol data sets from said first radio system unit to said apparatus body;

implementing, by a first processor in said apparatus body, a baseband processing function based on said first protocol data set; and controlling, by a second processor in said apparatus body, said radio transceiver such that a frequency of a radio signal associated with said radio transceiver, a transmission timing of said radio signal and a reception timing of said radio signal are changed based on said first protocol data set.

* * * * *